United States Patent
Kim et al.

(10) Patent No.: US 7,839,859 B2
(45) Date of Patent: Nov. 23, 2010

(54) VOICE ADAPTIVE GATEWAY PACING METHODS AND SYSTEMS FOR WIRELESS MULTI-HOP NETWORKS

(75) Inventors: Kyungtae Kim, West Windsor, NJ (US); Dragos Niculescu, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 97 days.

(21) Appl. No.: 12/326,291

(22) Filed: Dec. 2, 2008

(65) Prior Publication Data

US 2009/0141631 A1    Jun. 4, 2009

Related U.S. Application Data

(60) Provisional application No. 60/991,884, filed on Dec. 3, 2007.

(51) Int. Cl.
*H04L 12/28* (2006.01)
(52) U.S. Cl. ................................. 370/394; 370/748
(58) Field of Classification Search ......... 370/229–235, 370/252, 253, 338, 394, 401, 352–356; 714/748
See application file for complete search history.

(56) References Cited

U.S. PATENT DOCUMENTS

| | | | | |
|---|---|---|---|---|
| 6,424,626 | B1 * | 7/2002 | Kidambi et al. | 370/236 |
| 6,956,867 | B1 * | 10/2005 | Suga | 370/465 |
| 7,623,459 | B2 * | 11/2009 | Yang et al. | 370/235 |
| 2004/0015079 | A1 * | 1/2004 | Berger et al. | 600/437 |
| 2006/0252376 | A1 * | 11/2006 | Fok et al. | 455/67.13 |
| 2007/0286070 | A1 * | 12/2007 | Schliwa-Bertling et al. | 370/229 |
| 2009/0290598 | A1 * | 11/2009 | Pani et al. | 370/473 |

OTHER PUBLICATIONS

Wei et al., On Shaping TCP Traffic at Edge Gateways; IEEE Communications Society; Globecom 2004; pp. 833-839.
Elrakabawy et al., TCP with Gateway Adaptive Pacing for Multihop Wireless Networks with Internet Connectivity; Science Direct Computer Networks 52; Sep. 29, 2007; pp. 180-198; Elsevier.
Xu et al., TCP Behavior Across Multihop Wireless Networks and the Wired Internet; WoWMoM '02; Sep. 28, 2002; pp. 41-48; Atlanta, GA, USA.

* cited by examiner

*Primary Examiner*—Ricky Ngo
*Assistant Examiner*—Kan Yuen
(74) *Attorney, Agent, or Firm*—Joseph Kolodka; James Bitetto

(57) ABSTRACT

In accordance with aspects of the present principles, the quality of voice traffic and bandwidth utilization for data communication over a wireless multi-hop network may be improved. In an implementation of the present principles, a data packet transmission rate over a wireless multi-hop network may be controlled at an interface between the multi-hop network and a wired network based on a voice packet quality measure calculated from network parameters. Voice and data traffic quality and efficiency may be further improved by reordering a packet transmission queue at the interface to avoid timeout and/or varying a packet queue length at the interface using an acknowledgement window transmitted to a data packet sender.

8 Claims, 9 Drawing Sheets

VOICE ADAPTIVE GATEWAY PACING METHODS AND SYSTEMS FOR WIRELESS MULTI-HOP NETWORKS

RELATED APPLICATION INFORMATION

This application claims priority to provisional application Ser. No. 60/991,884 filed on Dec. 3, 2007, incorporated herein by reference.

BACKGROUND

1. Technical Field

The present principles generally relate to improving the quality of voice and data communication traffic and, more particularly, to improving the quality of voice and data communication traffic over a wireless multi-hop network.

2. Description of the Related Art

Most traffic transmitted over the internet employs a Transmission Control Protocol (TCP), which was originally designed for wired networks. A common means for providing internet access includes utilizing a wireless multi-hop network as an extension of a wired network or as a bridge between wired networks. FIG. 1A provides an example of a wireless multi-hop network 102 employed as a bridge between wired networks 114 and 116 through gateways 104 and 106, respectively. As illustrated in FIG. 1A, a wireless multi-hop network may be comprised of wireless nodes 108 that may act as transceivers through which a stream of TCP packets 118 may be transmitted between a client 110 in wired network 114 and a client 112 in wired network 116.

Unfortunately, TCP utilization in a dual wired/wireless multi-hop network configuration has a tendency to exhibit severe degradation of communication traffic. TCP was originally designed to provide reliable end-to-end delivery of data over unreliable networks. As discussed herein below, TCP has been carefully optimized in the context of wired networks with rules and protocols that are unsuitable for wireless multi-hop networks.

Another type of traffic that has recently become more prevalent in homes and institutions is Voice Internet Protocol (VoIP) traffic. VoIP capability is currently available in many cellular telephones as well, due to the convenience and cost savings it provides. VoIP, however, is different from most other traffic in that it has relatively stringent delivery requirements. While mechanisms for providing a quality of service (QoS) required by VoIP traffic have been developed for wired networks, current communication protocols do not sufficiently ensure that quality of service requirements of VoIP traffic over wireless networks are met. Rather, a large amount of research has focused on the optimization of the TCP performance over wireless networks. The majority of the solutions proposed by the research community fall in four main categories: connection splitting solutions, link layer solutions, client modification solutions and gateway solutions.

Connection Splitting Solutions

With continuing reference to FIG. 1A, key problems with using TCP over hybrid wireless/wired networks stem from the different characteristics of wireless networks and wired networks, such as the Internet. While most packet losses in wireless networks are due to hidden terminals and channel contention at the intermediate nodes, drops in the Internet or other wired network are almost always due to buffer overflows at the routers. One known solution to this network convergence problem involves splitting the TCP connection at an interface node between the wired and wireless portions of the network. The interface may be referred to as an internet gateway. Elements 104 and 106 of FIG. 1A are examples of internet gateways.

In accordance with connection splitting solutions, a TCP connection may be divided into three separate connections: (1) the connection between TCP client A 110 and edge router 104, (2) the connection between edge routers 104 and 106, and (3) the connection between edge router 106 and TCP client B 112. Data sent to the TCP client B 112 from TCP client A 110 is first received by the edge router 104. Thereafter, an acknowledgement is sent by the edge router 104 to the TCP client A 110 and data is forwarded to edge router 106 at the other side. Subsequently, the data is transferred to the TCP client B 112.

Connection splitting can hide the wireless link entirely by terminating the TCP connection prior to the wireless link at the base station or access point 104, 106. With this approach, the communication in wireless network 102 may be optimized independently of the TCP applications. However, connection splitting entails employing additional overhead to maintain two connections for one TCP communication session. The dual stack at the edge-router is required to keep track of all of the TCP connections. Connection splitting also violates end-to-end TCP semantics, which increases vulnerability to failure of proxies at an edge router because an acknowledgement to a sender is no longer a true indication that a receiver has received a data packet. Furthermore, connection splitting complicates the handover process.

Link Layer Solutions

Link layer solutions attempt to make the wireless link layer appear as a wired layer from the perspective of TCP senders and receivers. One such proposal is a snoop protocol. Here, a snoop agent is introduced at a base station to perform local retransmissions using information sniffed from the TCP traffic passing through the base station. Another link layer solution proposes QoS scheduling with priority queues in an access point (AP) to improve VoIP quality by placing TCP data in a lower QoS level.

Client Modification Solutions

With reference to FIG. 1B, a modified-client system 150 for improving TCP performance over a wireless network 160 is illustrated. A common client modification solution improves TCP performance by configuring TCP senders, such as modified TCP clients 152 and 154, to obtain knowledge of the wireless network with feedback information from the network of wireless nodes 162. However, because the solution relies on modification of existing TCP applications, it causes an interoperability problem with existing TCP applications such that communication with existing applications may be hindered. As a result, the solution has limited applicability.

Gateway Solutions

Gateway solutions address TCP performance problems over wireless networks by evenly spacing, or pacing, data sent into a multi-hop network over an entire round-trip time, so that data is not sent in a burst. Pacing may be implemented using a data and/or acknowledgement (ACK) pacing mechanism. For example, TCP-Gateway Adaptive Pacing (TCP-GAP) is a congestion control scheme that reduces bursts of TCP packets based on estimating 4-hop propagation delay and variance of recent round trip delay times (RTT) at an Internet gateway for wired-wireless hybrid networks. The TCP-GAP scheme is relatively responsive, provides fairness among multiple TCP flows and also provides better goodput than TCP-New Reno, which is another TCP-variant. However, TCP-GAP depends on network topology and fails to estimate TCP bandwidth accurately in the presence of real-time traffic, such as VoIP. In addition, congestion control is performed in accordance with the general TCP scheme, which tends to be too aggressive for wireless multi-hops.

While known TCP variants may improve TCP data transmission over wireless multi-hop networks, they fail to adequately provide or maintain a sufficient quality of VoIP traffic over wireless multi-hop networks through which TCP data is transmitted. In addition, even priority schemes, including priority built into a media access control layer such as Request to Send/Clear to Send (RTS/CTS) or 802.11e mechanisms, generally cannot protect voice traffic. Accordingly, there is a need for methods and systems for providing or maintaining a sufficient VoIP traffic quality while efficiently utilizing the remaining transmission capacity for data traffic.

SUMMARY

Methods and systems in accordance with various implementations of the present principles address the deficiencies of the prior art by providing adaptive bandwidth control methods and systems at an access gateway that may dynamically pace wired/wireless data flows based on voice traffic parameters. The quality of VoIP flows at the gateway may be monitored and the bandwidth used by data flows may be controlled before they enter the wireless multi-hop network. As a result, a sufficient VoIP traffic quality may be induced or maintained while efficiently utilizing the remaining transmission capacity for data traffic.

Additionally or alternatively, to maintain TCP performance, implementations of the present principles may employ TCP-specific mechanisms that suppress certain retransmissions across the wireless multi-hop network. Furthermore, in accordance with other aspects of the present principles, round trip delay times for data traffic may be reduced by modifying advertisement widows of acknowledgement packets to manage a packet queue length at the gateway.

Compared to prior art methods for improving TCP transmission over wireless multi-hop networks, implementations of the present principles retain the end-to-end semantics of TCP, do not require modifications of endpoints, and work in a variety of conditions, including different TCP variants, different numbers of transmitted data streams, various degrees of internet delays, different patterns of interference, different multi-hop topologies, and different traffic patterns.

In one implementation of the present principles, a method for improving the quality of data and voice communication traffic over a wireless multi-hop network includes monitoring network parameters for voice packets at an interface between a wired network and a wireless multi-hop network; determining a rate adjustment value for data traffic transmission over the wireless multi-hop network based on a voice packet quality measure calculated from the network parameters; and dynamically adjusting a data packet transmission rate over the wireless multi-hop network at the interface in accordance with the rate adjustment value to induce or maintain a voice quality level for voice packet traffic while maximizing bandwidth dedicated to data packet traffic.

In an alternate implementation of the present principles, a method for managing packet transmission through an interface between a wired network and a wireless multi-hop network at the interface to improve the quality of data and voice communication traffic over the networks includes monitoring sequence numbers of data packets received for transmission through an interface between a wired network and a wireless multi-hop network at the interface; receiving a most recently received data packet that has an older sequence number than a sequence number of a currently queued packet at the interface; and reordering a packet queue at the interface such that the most recently received packet is sent prior to the currently queued packet to avoid timeout for the most recently received packet and thereby reduce congestion on the wireless multi-hop network and improve traffic quality.

In another implementation of the present principles a method for managing a packet queue at an interface between a wired network and a wireless multi-hop network to improve the quality of data communication traffic while maintaining voice communication traffic quality over the networks includes determining a packet queue length at an interface between a wired network and a wireless multi-hop network; comparing the packet queue length to a first packet queue length threshold; and adjusting, at the interface, an acknowledgment window transmitted to a packet sender in one of said networks based on the comparing and based on the number of packets in transit in the other of said networks to reduce a round-trip delay time while maintaining voice communication traffic quality.

These and other features and advantages will become apparent from the following detailed description of illustrative implementations thereof, which is to be read in connection with the accompanying drawings.

BRIEF DESCRIPTION OF DRAWINGS

The disclosure will provide details in the following description of implementations of the present principles with reference to the following figures wherein.

DETAILED DESCRIPTION

Figure 1A:
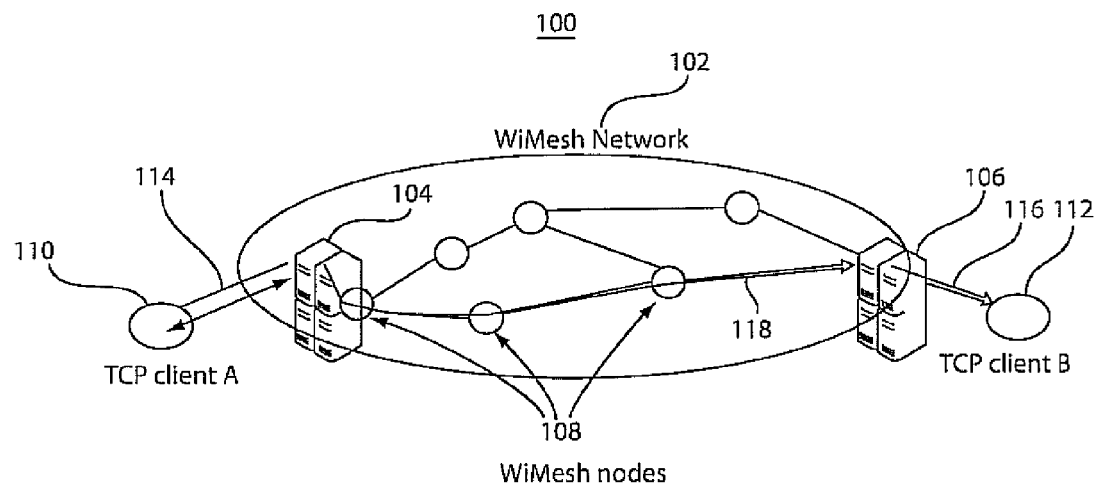
FIG. 1A is a high level block/flow diagram illustrating a prior art system for transmitting TCP traffic over a wired/wireless multi-hop hybrid network by applying a split approach.
Figure 1B:
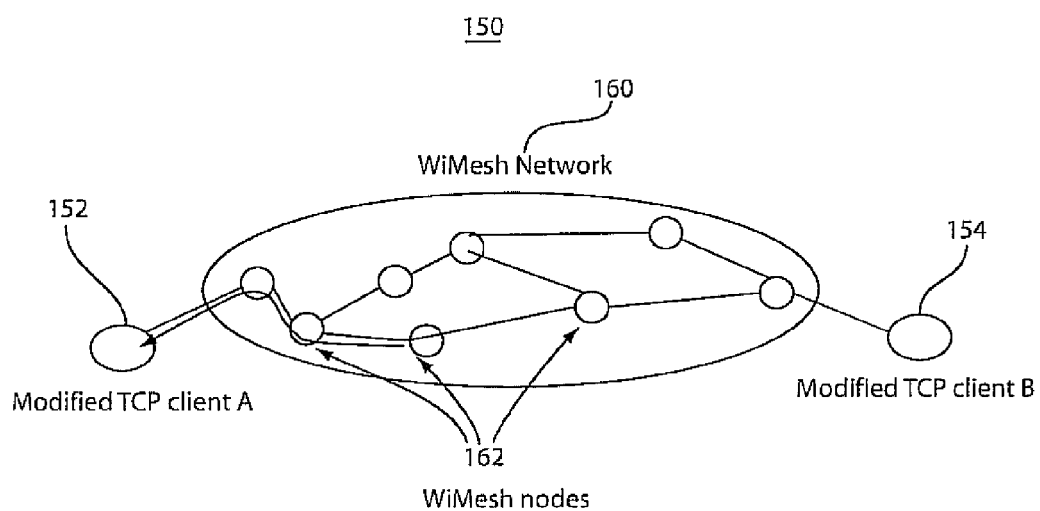
FIG. 1B is a high level block/flow diagram illustrating a prior art system for transmitting TCP traffic over a wired/wireless multi-hop hybrid network by modifying TCP clients.
Figure 2:
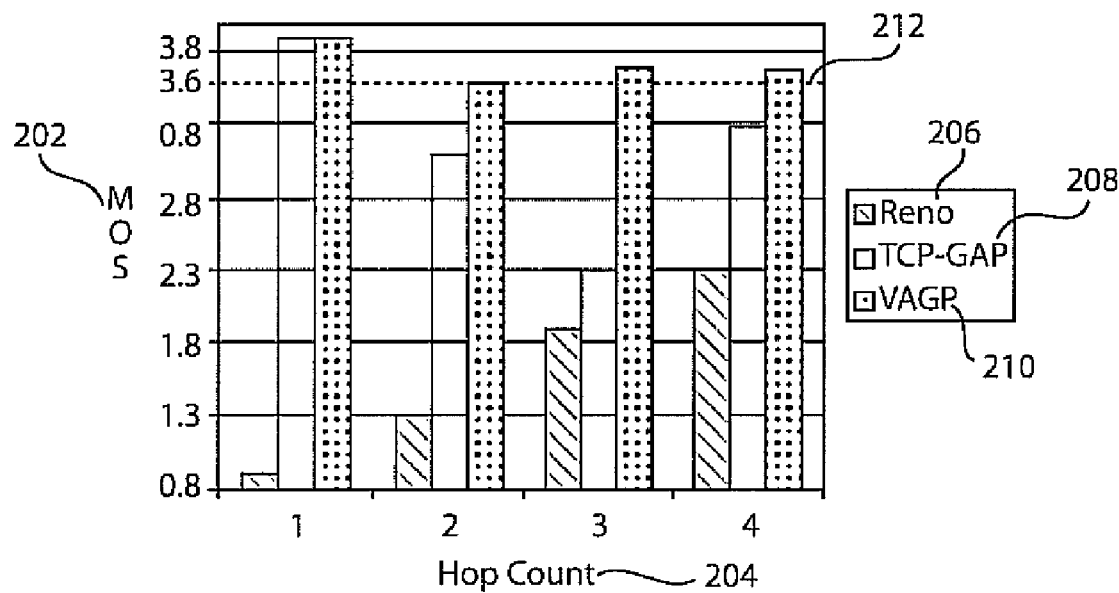
FIG. 2 is a plot contrasting voice packet quality measurements for voice traffic transmitted over a wireless multi-hop network in accordance with prior art methods to voice packet quality measurements for voice traffic transmitted over the wireless multi-hop network in accordance with an exemplary implementation of the present principles.

Although prior art methods for adapting TCP data traffic to wireless multi-hop networks, such as TCP-GAP, discussed above, may address some TCP performance issues, they fail to adequately protect the quality of voice packet traffic over wireless multi-hop networks through which TCP traffic is transmitted. For example, with reference to FIG. 2, a plot 200 illustrates the inadequacy of known TCP methods for transmitting voice packet traffic in the presence of data traffic on wireless multi-hop networks.

Plot 200 depicts voice quality measurements of voice packets transmitted with data traffic through a wireless multi-hop network utilizing TCP variants. TCP variants tested include Reno 206 and TCP-GAP 208, which are known variants, and an implementation of the present principles 210, referred to herein as a Voice Adaptive Gateway Pacer (VAGP) system and method. The voice quality measure employed is a mean opinion score (MOS), which is discussed in more detail below. The y-axis of plot 200 corresponds to an MOS measure 202 while the x-axis corresponds to the number of nodes 204 through which voice packets are transmitted on a wireless multi-hop network.

As discussed below, an MOS score of 3.6 is comparable to voice communication over a standard Global System for Mobile communications (GSM) network. Thus, any voice traffic should have an MOS quality of at least 3.6, which corresponds to element 212 in FIG. 2. As shown in plot 200, prior art transmission protocols do not provide an adequate voice quality for VoIP packets transmitted with TCP data over a wireless multi-hop network. For example, voice packets transmitted in accordance with a Reno 206 protocol fall well below the GSM quality threshold 212. In addition, although TCP-GAP 208 provides sufficient voice quality for a one-hop wireless network, the voice quality dramatically decreases when the hop count is increased to three hops. In all cases in which more than one hop is employed, voice packet quality for the TCP-GAP 208 is below the GSM standard.

In contrast to prior art methods, protocols in accordance with aspects of the present principles, such as VAGP 210, consistently maintain voice quality for VoIP packets that is at or above the GSM quality threshold 212. Furthermore, as discussed herein below, protocols in accordance with aspects of the present principles also enable dynamic utilization of remaining transmission resources to provide sufficient goodput and throughput for data traffic transmitted with voice packets across a wireless multi-hop network.

Other benefits of methods and systems in accordance with implementations of the present principles include maintaining end to end semantics and compatibility with existing TCP protocols, providing complete separation between traffic flows and providing swift responsiveness to changing conditions. In addition, implementations may be placed or performed in wireless gateways to monitor downstream TCP traffic. Furthermore, implementations of the present principles are effective under a variety of conditions such as different network topologies, different TCP flows, diverse network delays, various interference patterns, and different wireless capacities. Implementations also do not require setting of parameters because an initial setting successfully achieves a desired voice quality under different conditions and situations.

A main factor of voice packet quality degradation in a wireless multi-hop networks is interference between nearby nodes. The interference problem is further exacerbated due to standard TCP transmission properties, such as burstiness resulting from aggressive attempts to maximize bandwidth usage for data traffic. Several characteristics of TCP data traffic and VoIP traffic that may hinder their coexistence are discussed herein below.

One such characteristic is that TCP is an end to end protocol. There are no explicit signaling mechanisms in the network to tell the TCP peers how fast to send, how much to send, or when to slow down a transmission. A peer is responsible for controlling these parameters from implicit knowledge it obtains from the network or from explicit knowledge it receives from the other peer. TCP is aggressive in discovering link bandwidth so that it can achieve maximum utilization of network resources. For example, TCP protocols employ large windows in which packets are transmitted between acknowledgements received from peers. This characteristic aggravates channel contention on wireless links.

As mentioned above, another characteristic is that TCP transmission produces bursty traffic. In contrast, VoIP traffic is relatively uniform and generally has a constant bit rate. In the so called 'slow' start phase, TCP doubles its window for each ACK received. In reality, this behavior generates an exponential increase in bandwidth consumption. As a result, trains of packets hog the medium for prolonged times. Conversely, VoIP traffic generally has regularity in the network delay and a low loss rate. When the network is congested by interference or excessive TCP data, VoIP traffic suffers from increased network losses and delays. In this situation, a TCP packet sender transitions to its recovery stage, reduces its sending rate until the network is recovered from congestion, and then transmits all postponed packets in bursts. The cycle of burstiness leads to both low utilization for TCP and unacceptable quality for voice due to the interference it causes on a wireless multi-hop network.

Further, TCP was designed with the assumption that losses are due to congestion. Accordingly, standard TCP behavior may lead to poor performance over wireless multi-hop networks, such as those based on 802.11, because packet drops may be a result of hidden terminal induced problems, such as channel interference and TCP data/ACK contention, rather than congestion.

In addition, VoIP packets are small while TCP packets are large. For a given bit error rate, TCP packets would tend to have less success than voice packets. Thus, in the event that a bit error rate is large, many TCP data packets would be retransmitted across multi-hop links, thereby generating even more load that in turn generates more interference and degradation.

As mentioned above, most prior methods have largely focused on improving TCP performance over multi-hop networks and do not address the coexistence problem of TCP with real-time applications, such as VoIP. VoIP traffic is generally transmitted at a relatively constant bit rate, has very tight delay and loss requirements, and should always be served prior to TCP traffic. Classical solutions such as priority queues, bandwidth limitation, and traffic shaping do not provide satisfactory solutions for the coexistence problem. Even if voice traffic has priority locally within a node, bursty TCP traffic affects voice packets on other nodes within the interference range.

Aspects of the present principles are applicable to data and voice traffic flows in a shared network and enable operable coexistence in interference-ridden conditions such as multi-hop networks and wireless local area networks (WLANs). In accordance with aspects of the present principles a sufficient VoIP quality may be induced or maintained without sacrificing TCP performance and network utilization. In addition, TCP data traffic may be modified to have a more constant bit rate so that it is relatively predictable, thereby improving both voice traffic quality and data traffic quality.

One or more aspects of the present principles address not only the problem of bandwidth estimation, they also address the shape of data traffic to reduce burstiness and improve the quality of traffic. Certain implementations use existing VoIP traffic to shape incoming TCP traffic and both protect VoIP quality and maximize TCP resource utilization. Method implementations may apply a continuous process that adapts to changing conditions, such as wireless channel conditions, VoIP load, TCP flow arrivals, internet delays—all of which may vary within seconds. Aspects of the present principles may limit or adjust TCP data traffic share of bandwidth resources within milliseconds of detecting reduced or changed capacity. At the same time, aggressive discovery of when additional bandwidth is available may also be achieved while protecting the quality of voice traffic.

From queuing theory it can be shown that bursty traffic produces higher queuing delays, more packet losses, and lower goodput. It has been observed that TCP's congestion control mechanisms and self-clocking schemes create extremely bursty traffic in networks with large bandwidth-delay products, cause long queues and increase the likelihood of massive losses. In addition, wireless multi-hop network traffic tends to have a self-similar behavior, thereby making it difficult to provide stable rates for VoIP traffic.

Figure 3:
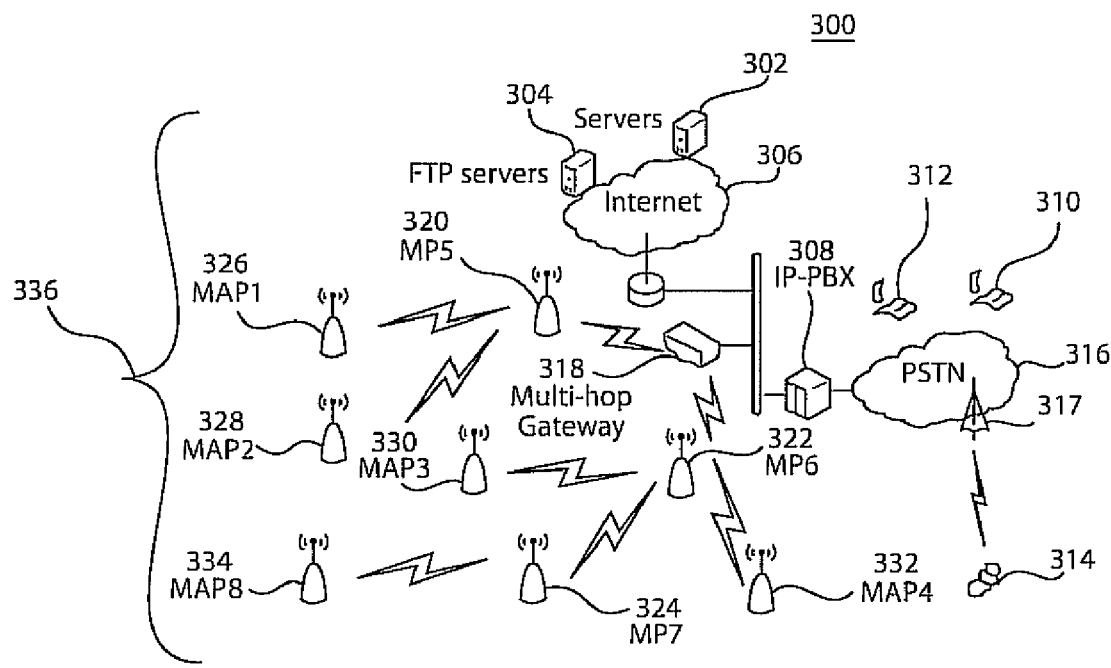
FIG. 3 is a high level block diagram illustrating an exemplary hybrid wired/wireless multi-hop network in which aspects of the present principles may be implemented.

Referring now to FIG. 3, a wired/wireless hybrid network 300 is illustrated. As depicted in FIG. 3, the network 300 may include a wired internet network 306, a wired public switched telephone network (PSTN) 316, and a wireless multi-hop network 336. The wired internet network may include FTP servers 304 and other servers 302 through which clients (not shown) may send and receive data or voice packets. In addition, the PSTN 316 may include telephones, such as elements 310 and 312, and may additionally be connected to cellular telephone base stations 317 through which telephone service may be provided to cellular telephones 314. The wireless multi-hop network 336 may be connected to wired networks 306 and 316 through a Multi-hop Gateway 318, through which data and voice traffic may flow to and from Multi-hop Points (MPs) 320-324 and Multi-hop Access Points (MAPs) 326-334. MAPs 326-334 may act as access points for clients (not shown) to communicate voice and data traffic with any nodes in networks 306, 316 and 336. Further, MPs 320-324 may act as transceivers through which data traffic may flow from MAPs to other points in the network 300. For example, as shown in FIG. 3, a client connected to MAP5 334 may communicate voice and/or data traffic to clients on wired internet network 306 and/or telephones 310-314 on network 316 though a multi-hop stream via MP7 324, MP6 322 and gateway 318. Of course, other connection configurations are also possible as understood by those of skill in the art. The multi-hop leg of transmission in wireless network 336 is where VoIP traffic quality is most vulnerable to degradation.

Figure 4:
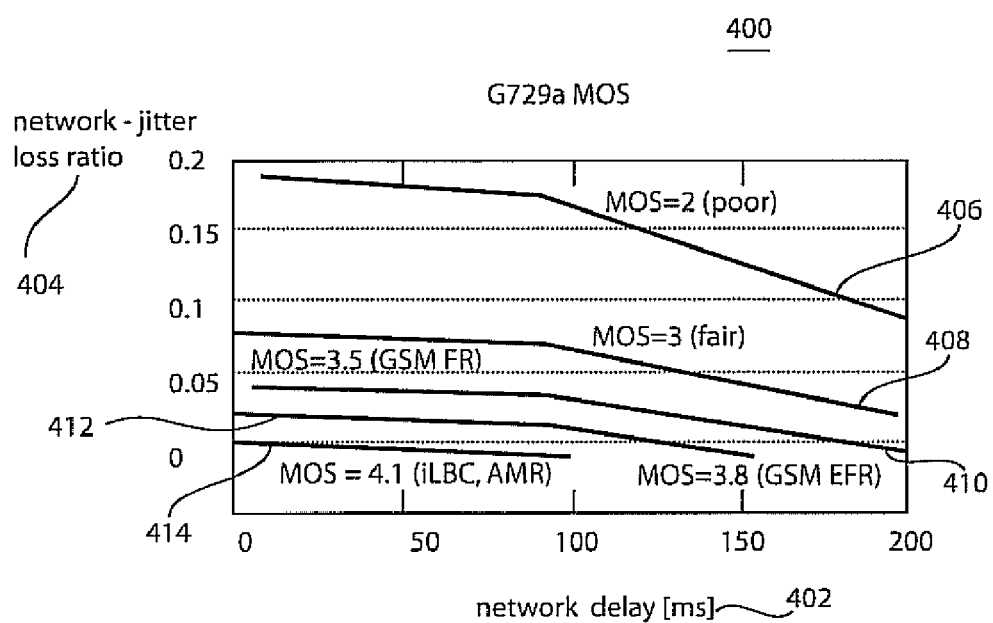
FIG. 4 is a plot illustrating exemplary voice quality measures that may be employed in accordance with exemplary implementations of the present principles.

With reference to FIG. 4, as mention above, VoIP traffic has a relatively constant bit rate, and for certain voice coders (vocoders), such as vocoders G711, G729, G729a, a VoIP quality MOS may be estimated as a function packet loss and mouth-to-ear, one-way delay. Loss may include packets lost in the network and packets that miss their time deadline because of jitter. FIG. 4 depicts MOS values in a plot 400 of Network and Jitter Loss Ratio 404 v. Network Delay 402 in ms for a 60 ms playout-buffer and 25 ms G729a vocoder delay. Elements 406, 408, 410, 412 and 414 in FIG. 4 correspond to MOS values of 2.0, 3.0, 3.5, 3.8 and 4.1, respectively.

An MOS value of 2 is generally considered a poor value while an MOS value of 3 is generally considered a fair value. MOS values of 3.5 and 3.8 respectively correspond to voice quality thresholds for telephone calls transmitted in accordance with GSM-Full Rate (FR) and GSM Enhanced-Full Rate (EFR) speech coding. Additionally, an MOS value of 4.1 corresponds to a voice quality threshold for telephone calls transmitted in accordance with internet Low Bit Rate Codec (iLBC) and an Adaptive Multi-rate (AMR) compression scheme. In order to obtain an MOS value of 3.6, which is comparable to GSM quality, the network should deliver all packets in less than 160 ms, or deliver 98% of packets in less than 104 ms. As mentioned above, implementations of the present principles have consistently achieved VoIP traffic quality of 3.6 or above in various multi-hop configurations in the presence of TCP data transmission.

As mentioned above, burstiness of TCP traffic is the main cause of VoIP traffic degradation in wireless multi-hop networks. It can be shown that there is a direct correlation between burst length associated with standard TCP traffic transmitted over a wireless multi-hop network and VoIP packet loss and VoIP packet delay. In addition, it can also be shown that increased burst lengths associated with standard TCP traffic reduces the amount of TCP data traffic goodput transmitted through the wireless multi-hop network.

Furthermore, TCP uses a sliding window-based protocol, which determines the number of packets that can be sent, and uses the receipt of acknowledgments to trigger the sending of packets. The window used by a TCP sender is chosen based on its view of the congestion in the network and based on the receiver's acceptable number of bytes determined from the advertisement window in acknowledgements. If the window size is too large, then the sender is permitted to inject more traffic than the network can handle. Given a wireless multi-hop network, there exists a TCP window size W* at which TCP's bandwidth consumption is appropriate such that VoIP quality may be induced or maintained. W* depends on many conditions, including the presence of real time traffic. Default TCP algorithms are not capable of discovering W* and current TCP variants do not operate around W*. Instead, TCP variants typically increase and develop their average window in a way that results in VoIP degradation, or in low TCP performance if VoIP traffic is not present. In addition, the excessive window size generated during standard TCP and TCP variant transmissions induces unfairness between traffic streams.

As mentioned above, existing methods for controlling TCP traffic include modification of TCP clients. However, such methods are undesirable due to their incompatibility with existing TCP systems. Furthermore, even enhanced TCP endpoints cannot possibly protect traffic in the wireless multi-hop network path. Classical methods of controlling TCP traffic include applying priority queues, traffic shaping and instrumenting packets to manipulate a receiver's advertisement window (awnd). However, it can be shown that these classical methods do not adequately maintain VoIP quality in the presence of TCP data traffic over wireless multi-hop networks.

Figure 5:
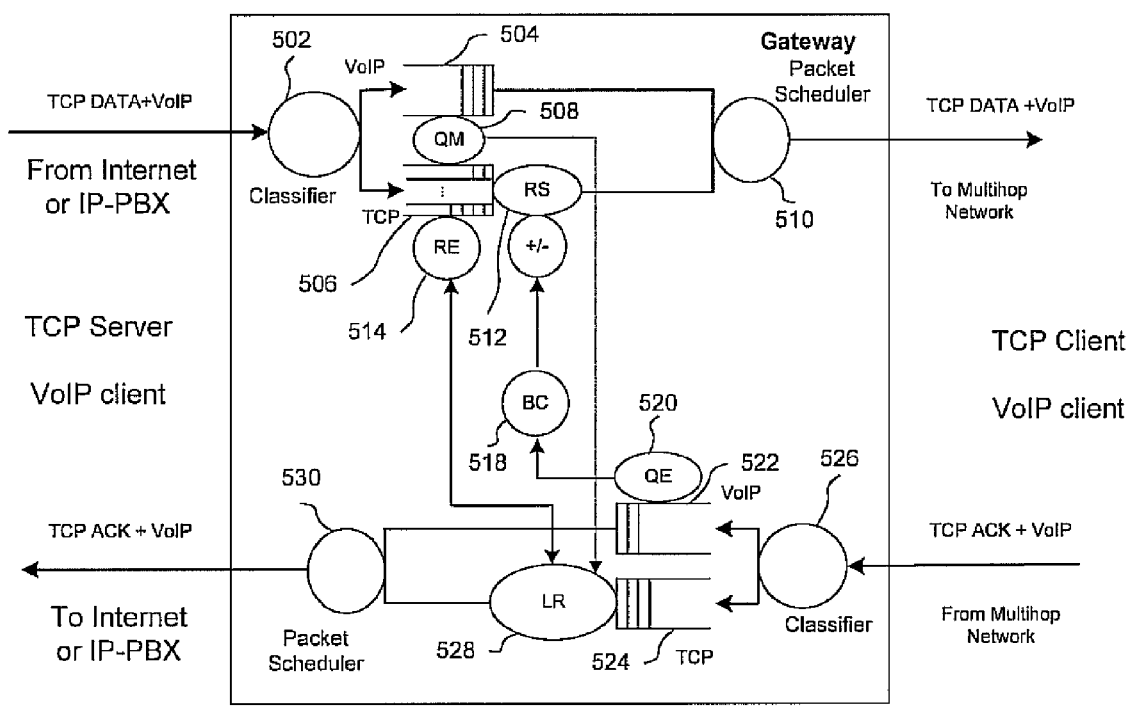
FIG. 5 is an exemplary gateway system for improving the quality of voice and data traffic over a wireless multi-hop network in accordance with one or more implementations of the present principles.

Referring now to FIG. 5 with continuing reference to FIG. 3, system and method implementations of the present principles for improving the quality of data and voice communication traffic over a wireless multi-hop network are described. In wireless multi-hop networks, capacity is highly variable and depends on a multitude of factors such as the number of hops and their configuration, the degree and type of interference, the actual capacity of each hop, and the amount of voice traffic transmitted. To support VoIP under varying conditions, available bandwidth should be estimated in real-time.

Furthermore, a particular VoIP traffic quality may be induced or enhanced by pacing TCP data packets to modify TCP data traffic at a gateway, such as gateway 318. Pacing evens out the transmission of a window of packets based on a shaper parameter R. After a packet of size pkt_size is transmitted to a wireless multi-hop network from a wired network, for example, the next packet is scheduled no earlier than $$\frac{pkt\_size}{R}.$$

The gateway may choose a rate R based on the network status to determine how much data to send as well as when to send data. In accordance with aspects of the present principles, existing voice traffic may be utilized as probe traffic to estimate the rate R that is applied to TCP data traffic at the gateway:

$$R_{TCP} = \sum_{i=1}^{N} R_{TCP_i} = \left( \frac{1}{\overline{SRTT}} + R_{adjustment} \right). \quad (1)$$

wherein $R_{TCP}$ corresponds to the total data packet transmission rate for all i data streams, $R_{TCP_i}$ corresponds to the data packet transmission rate for a particular data stream, $\overline{SRTT}$ corresponds to the average RTT of recent samples and $R_{adjustment}$ is a rate adjustment value.

The bandwidth for TCP data traffic may be estimated by measuring the average RTT of recent samples, $\overline{SRTT}$, with the rate adjustment, $R_{adjustment}$, from the variation of VoIP quality. The adaptive transmission rate gasp for TCP bandwidth may be computed at the wireless multi-hop network gateway and may be allocated to each TCP data traffic flow according to a fair bandwidth sharing policy.

Rate-based data traffic control may be applied to TCP data traffic to smooth out burstiness for flows with a large Bandwidth Delay Product (BDP) that have intra-flow burstiness and for other flows which may exhibit inter-flow burstiness. A BDP or Bandwidth X delay product refers to the product of a data link's capacity and its end-to-end delay. BDP may alternatively correspond to the product of a data link's capacity and its round trip delay time.

In accordance with aspects of the present principles, a gateway may be designed to release packets smoothly into the network rather than in bursts. System and method implementations of the present principles control the data transmission rate and dynamically adjust TCP sending rate parameters to utilize residual bandwidth while maintaining a sufficient VoIP quality. Thus, implementations of the present principles may serve two main functions: 1) taming the bandwidth discovery nature of TCP at least for a wireless multi-hop portion of a network to provide high VoIP traffic quality and 2) maintaining high utilization for TCP data traffic.

Referring again to FIG. 5 with continuing reference to FIG. 3, a system 500 for improving the quality of data and voice communication traffic over a wireless multi-hop network in accordance with one exemplary implementation of the present principles is illustrated. System 500 may be implemented at an interface between a wired network and a wireless multi-hop network. For example, system 500 may be implemented in gateway 318 of hybrid network 300. The gateway 500 may include a classifier 502 configured to parse VoIP traffic from TCP data traffic received from one or more wired networks such as the internet and/or an internet protocol private branch exchange network (IP-PBX), for example. VoIP traffic may be diverted to a voice packet queue 504 while TCP data traffic may be sent to a data packet queue 506, both of which may be managed by a queue manager 508. Voice and data traffic may also be managed by a packet scheduler 510 for the transmission of voice and data traffic to a wireless multi-hop network.

Conversely, system 500 may include a classifier 526 configured to parse VoIP traffic from TCP data acknowledgement traffic received from the wireless multi-hop network. Similarly, voice packet traffic may be sent to a voice packet queue 522 and TCP data acknowledgement traffic may be sent to a data packet queue 524. In addition, a packet scheduler 530 may transmit corresponding voice and data acknowledgement packets to one or more wired networks, such as the internet, an IP-PBX network, or another type of telephone network. System 500 may further include a rate shaper 512, a bandwidth controller 518, a voice traffic quality evaluator 520, a redundancy eliminator 514 and a local recovery module 528, which are described in more detail below.

It should be understood that while implementations of the present principles are described herein with respect to TCP data traffic flow transmitted from a wired network to a wireless multi-hop network, principles disclosed herein may be applied to the opposite flow, in which TCP data traffic is transmitted from a wireless multi-hop network to a wired network.

It should be understood that system 500 and other implementations of the present principles described herein may be entirely hardware, entirely software or including both hardware and software elements. In a preferred embodiment, the present principles are implemented in software, which includes but is not limited to firmware, resident software, microcode, etc.

Implementations may include a computer program product accessible from a computer-usable or computer-readable medium providing program code for use by or in connection with a computer or any instruction execution system. A computer-usable or computer readable medium may include any apparatus that stores the program for use by or in connection with the instruction execution system, apparatus, or device. The medium can be magnetic, optical, electronic, electromagnetic, infrared, or a semiconductor system (or apparatus or device). The medium may include a computer-readable medium such as a semiconductor or solid state memory, magnetic tape, a removable computer diskette, a random access memory (RAM), a read-only memory (ROM), a rigid magnetic disk, an optical disk, etc.

Figure 6:
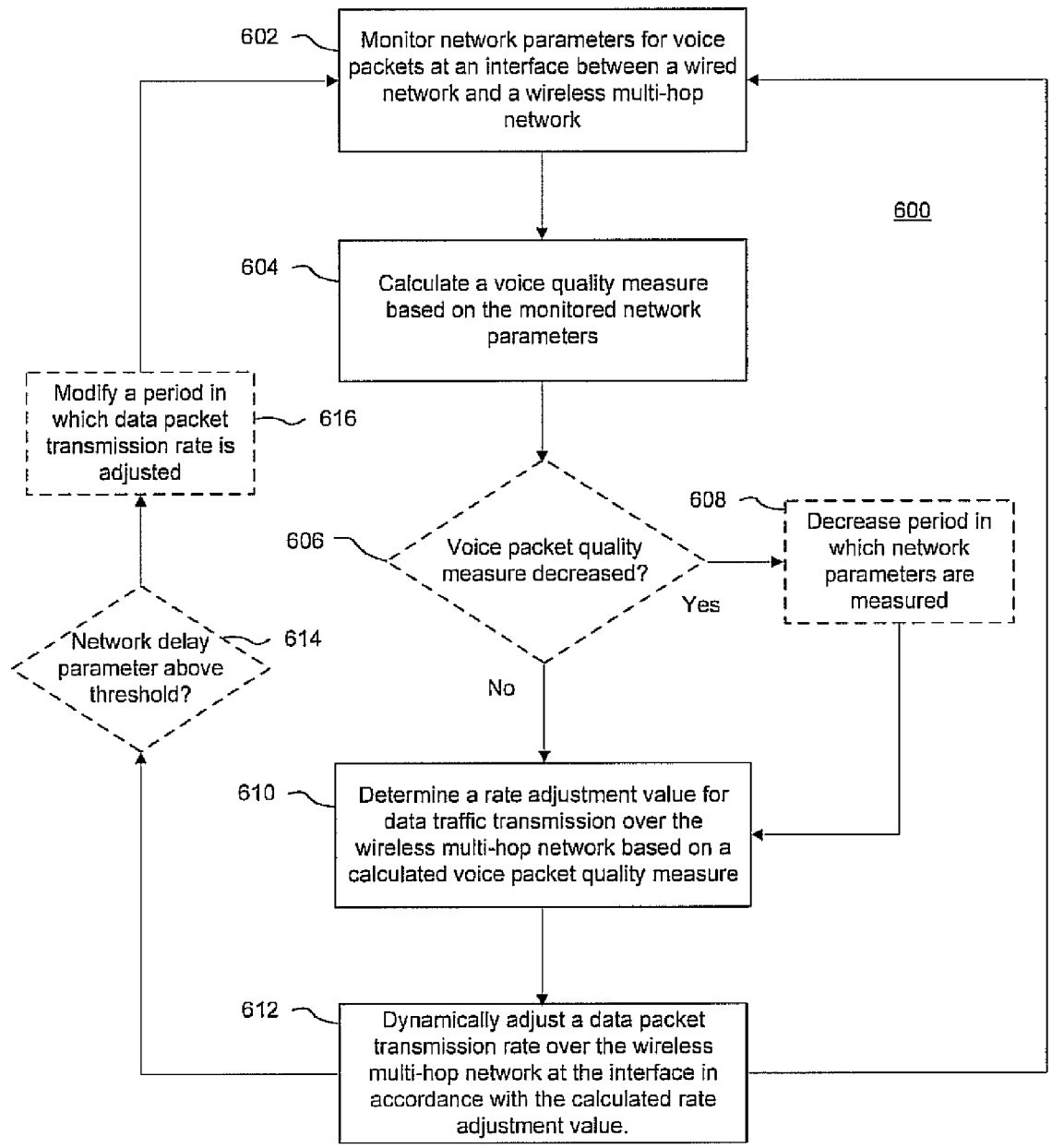
FIG. 6 is a high level block/flow diagram of an exemplary method for improving the quality of data and voice communication traffic over a wireless multi-hop network in accordance with one or more exemplary implementations of the present principles.

Referring to FIG. 6 with continuing reference to FIG. 5, a method 600 for improving the quality of data and voice communication traffic over a wireless multi-hop network in accordance with one exemplary implementation of the present principles is illustrated. Method 600 may begin at step 602 in which network parameters for voice packets are monitored. For example, the voice packet parameters may be monitored at the gateway or interface between a wired network and a wireless multi-hop network. Further, the voice packet quality evaluator 520 may be configured to periodically monitor network parameters of VoIP traffic, which may include network delay, network loss, and/or jitter loss.

At step 604, a voice quality measure may be calculated based on the monitored network parameters. For example, the quality evaluator 520 may, for example, be configured to calculate an MOS value of monitored VoIP traffic.

Optionally, step 606 may be performed in which it is determined, at the quality evaluator 520, for example, whether the voice packet quality has decreased from one or more previous periods. If the voice quality has decreased, then the period in which network parameters are measured may optionally be decreased at step 608 to enable a quicker response and prevent a further reduction in voice quality. Thereafter, the process may proceed to step 610.

At step 610, a rate adjustment value for data traffic transmission over the wireless multi-hop network may be determined based on a voice packet quality measure calculated from the network parameters. For example, an MOS value calculated by the quality evaluator 520 may be reported to bandwidth controller 518. Based on the MOS value, the bandwidth controller 518 may be configured to estimate the bandwidth portion dedicated to TCP traffic over the wireless multi-hop network and translate the available bandwidth into a TCP sending rate over the wireless multi-hop network. Table 1, provided below, illustrates an exemplary algorithm indicating how a bandwidth controller may determine a TCP sending rate.

TABLE 1

Algorithm 1

Voice quality parameters: $Q_{good}$, $Q_{fair}$, $Q_{poor}$, $Q_{choke}$;
TCP Rate parameters: $R_{good}$, $R_{fair}$, $R_{poor}$, $R_{choke}$;
Input: continuous VoIP traffic
Output: R, $R_i$ TCP shaper rates
$R_i \Leftarrow$ Distribute R to each TCP stream, e.g. in accordance with fair share
$D_{voip}$: one way VoIP network delay
$P_{normal}$: rate adjustment period for $D_{normal}$, 100 ms
$P_{alert}$: rate adjustment period for $D_{alert}$, 20 ms
loop
   for all TCP streams i do
     if MOS > $Q_{good}$ then
       $R_i \Leftarrow R_i(1 + R_{good})$;
     else if MOS $\in \lfloor Q_{good}, Q_{fair})$ then
       $R_i \Leftarrow R_i(1 + R_{fair})$;
     else if MOS $\in \lfloor Q_{fair}, Q_{poor})$ then
       $R_i \Leftarrow R_i(1 - R_{poor})$;
     else if MOS $\leq Q_{poor}$ then
       $R_i \Leftarrow R_i(1 - R_{choke})$;
     end if TABLE 1-continued Algorithm 1 end for
   if $D_{voip} < D_{alert}$ then
     adjust period $\Leftarrow P_{normal}$;
   else if $D_{voip} \geq D_{alert}$ then
     adjust period $\Leftarrow P_{alert}$;
   end if
   wait(period) while evaluating VoIP quality;
end loop A bandwidth controller may first estimate the bandwidth portion to dedicate to TCP data traffic by employing thresholds for a measured or calculated MOS value. For example, a measured or calculated MOS value may be classified using four thresholds, $Q_{good}$, $Q_{fair}$, $Q_{poor}$, and $Q_{choke}$, for triggering TCP rate adjustment. TCP rate adjustment may be performed by increasing the data packet transmission rate over the wireless multi-hop network by an $R_{good}$ or an $R_{fair}$ percentage of a currently allocated TCP data transmission rate or decreasing the rate by an $R_{poor}$ or an $R_{choke}$ percentage of currently allocated TCP data transmission rate.

For example, if a calculated or measured MOS value is greater than $Q_{good}$, then the rate allocated for TCP data transmission, $R_i$, may be adjusted by increasing it by an $R_{good}$ percentage of a currently allocated data transmission rate. If a calculated or measured MOS value is less than or equal to $Q_{good}$ and greater than $Q_{fair}$, then the rate allocated for TCP data transmission, $R_i$, may be adjusted by increasing it by an $R_{fair}$ percentage of a currently allocated data transmission rate. In addition, if a calculated or measured MOS value is less than or equal to $Q_{fair}$ and greater than $Q_{poor}$, then the rate allocated for TCP data transmission, $R_i$, may be adjusted by decreasing it by an $R_{poor}$ percentage of a currently allocated data transmission rate. Also, if a calculated or measured MOS value is less than or equal to $Q_{poor}$, then the rate allocated for TCP data transmission, $R_i$, may be adjusted by decreasing it by an $R_{choke}$ percentage of a currently allocated data transmission rate.

It can be shown that parameter values of $Q_{good}=3.9$, $Q_{fair}=3.7$, $Q_{poor}=3.6$, $Q_{choke}=3.3$ for voice packet quality and $R_{good}=5\%$, $R_{fair}=3\%$, $R_{poor}=10\%$, $R_{choke}=50\%$ for TCP rate adjustment may be employed to induce or maintain a voice packet quality MOS value of 3.6 or greater in a wireless multi-hop network while enabling very good dynamic utilization of remaining bandwidth for TCP data traffic also transmitted on the multi-hop network. These values are somewhat conservative to preserve voice quality, as drops are inevitable due to sudden changes in channel conditions or traffic patterns. In addition, these parameter values provide good results across widely different patterns and conditions.

At step 612, a data packet transmission rate over the wireless multi-hop network may be adjusted at the interface in accordance with the rate adjustment value to induce or maintain a voice quality level for voice packet traffic while maximizing bandwidth dedicated to data packet traffic. For example, the rate adjustment value may correspond to any one or more of $R_{good}$, $R_{fair}$, $R_{poor}$, $R_{choke}$. Additionally, the bandwidth controller 518 may be configured to inform the rate shaper 512 of the adjusted TCP data packet transmission rate value at a regular period $P_{norm}$. The rate shaper 518 may distribute available bandwidth to each TCP data traffic stream transmitted to the wireless multi-hop network. For example, the rate shaper 512 may either delay or accelerate the rate at which TCP data packets are sent to the packet scheduler 510 for transmission into the wireless multi-hop network in accordance with the adjusted TCP data packet transmission rate value.

Steps 602-612 may be performed and executed every period for stable VoIP one-way network delay values $D_{norm}$ measured at step 602. However, if the network delay is larger than a threshold $D_{alert}$, then the process may be performed more often with a shorter period. As shown in FIG. 4, for an MOS value of 3.6 to be achieved, less than 2% of voice traffic should be lost and delivery should be made in less than 170 ms. Due to reduced capacity or higher load, one-way VoIP network delay may reach the threshold $D_{alert}$ for a given 2% packet loss ratio. In this situation, the normal TCP rate adjusting period, $P_{norm}$, may not be adequate to react quickly and maintain a voice packet MOS quality of 3.6.

Thus, at step 614, it may optionally be determined whether a network delay value or parameter $D_{voip}$ is larger than a threshold $D_{alert}$. If a network delay value $D_{voip}$ is larger than a threshold $D_{alert}$, then the period in which the data packet transmission rate is adjusted, period or $P_{norm}$, may be optionally modified at step 616. For example, the quality evaluator 520 may be configured to perform step 614 and reduce the period $P_{norm}$ to $P_{alert}$. In this way, for example, the period in which the data packet transmission rate is adjusted may be modified based on a network delay parameter. Otherwise, if network delay value or parameter is not larger than a threshold $D_{alert}$, then the period in which the data packet transmission rate is adjusted may remain the same.

Returning to step 612, it should be noted that in one or more implementations of the present principles, the data packet transmission rate may be increased in one adjustment period to a fraction of a maximum data packet transmission rate achieved in response to determining that the voice quality level is maintained for a specified period and a currently adjusted data packet transmission rate is less than the fraction of maximum data packet transmission rate achieved. For example, during a normal operation of transmitting data packets over a wireless multi-hop network, there is a possibility of non-work-conserving transmission in which TCP flows or streams have a long period of low bandwidth utilization before it reaches a maximum or optimal share. By monitoring the voice quality level, an optimum TCP share may be quickly recovered while protecting the quality of VoIP traffic. To institute fast responsiveness in allocating available bandwidth to TCP data transmission, the rate shaper 512 may be configured to adjust the TCP data transmission rate by a larger adjustment interval if a good voice quality is maintained. The rate shaper 512 may monitor both the time in which a good voice quality is maintained and the adjusted data packet transmission rate, $R_i$, received from the Bandwidth Controller 518. In addition, the highest achieved rate, $R_{max}$, may be employed by Rate Shaper 512 to apply the larger adjustment interval.

For example, $R_{max}$ may be utilized to quickly reach the optimum share for TCP bandwidth. In one implementation of the present principles, if the voice quality has recovered from $Q_{poor}$ to $Q_{good}$ and the $Q_{good}$ voice quality is held for some period, e.g., 5×period or 5×$P_{norm}$, the rate shaper 512 may be configured to increase $R_i$ to $$\frac{R_{max}}{2}.$$

For example, the rate shaper 512 may be configured to compare the estimated or adjusted data packet transmission rate $R_i$ to $$\frac{R_{max}}{2}$$

and if $R_i$ is less than $$\frac{R_{max}}{2},$$

then the rate shaper 512 may increase $R_i$ to $$\frac{R_{max}}{2}.$$

It should be understood, however, that other ways of applying a larger adjustment interval to institute fast responsiveness may be devised by those of ordinary skill in the art in light of the above-recited teachings.

In accordance with method 600, a share of the bandwidth for data traffic may be limited in favor of voice traffic to improve or maintain voice traffic quality. However, in some circumstances, limitation of bandwidth allocated to data traffic may cause performance degradation for data traffic due to a data packet queue overflow at the gateway. In addition, the limitation of bandwidth allocated to data traffic may cause a timeout at the data traffic sender as a result of a larger queuing delay. Timeout or timer expiration may induce multiple packet retransmissions for lost packets if the data packet sender adopts a "Go-back-N" algorithm, for example, to recover the packet loss. Because of the generally larger packet size of data packets, e.g., TCP packets, as compared to voice packets, data traffic is subjected to a higher packet drop ratio due to interference in a wireless multi-hop environment. The packet drop may decrease the sending rate at the sender side, which results in poor performance in high BDP networks. Moreover, the packet drops may trigger a data traffic retransmission timer to expire. Furthermore, copies of packets that have already been received at their intended destination may be retransmitted over the wireless multi-hop network due to a timeout, which in turn wastes wireless multi-hop resources and further decreases data transmission performance. To address these problems, one or more steps/methods described with regard to FIGS. 7-10 may be performed to improve transmission efficiency over a wired/wireless multi-hop network.

Figure 7:
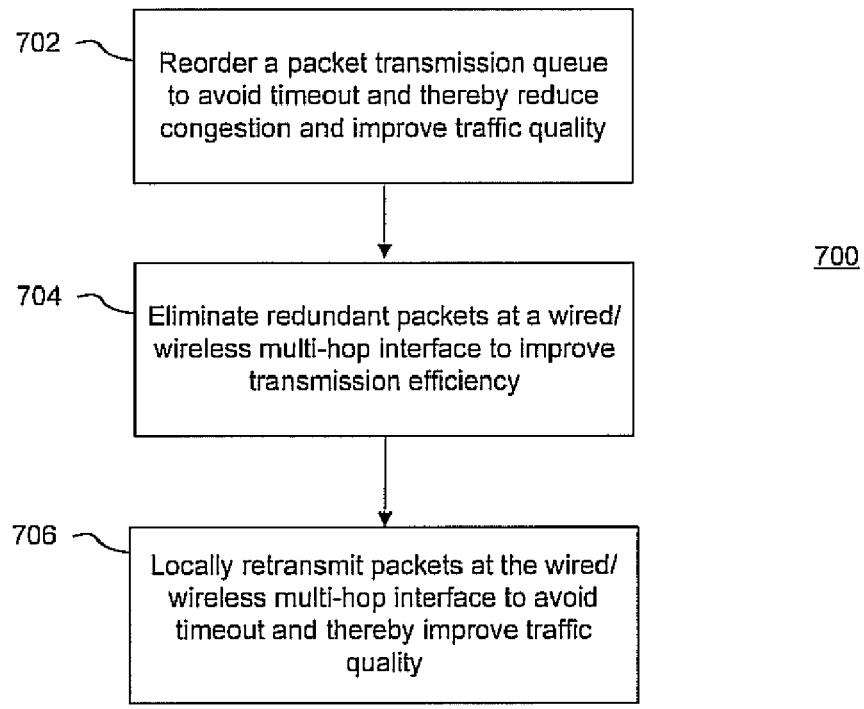
FIG. 7 is a high level block/flow diagram of an exemplary method for managing packet transmission through an interface between a wired network and a wireless multi-hop network at the interface to improve the quality of data and voice communication traffic over the networks in accordance with one or more implementations of the present principles.

Referring now to FIG. 7 with continuing reference to FIG. 5, a method 700 for managing packet transmission through an interface between a wired network and a wireless multi-hop network to improve the quality of data and voice communication traffic over the networks is illustrated. It should be understood that any one or more steps of method 700 may be performed at the interface in addition to or simultaneously with method 600 to further improve or maintain the quality of voice and data communication. Alternatively, method 700 may be performed independently of or without method 600.

Method 700 may begin by reordering a packet queue to avoid timeout and thereby reduce congestion and improve traffic quality at step 702. In addition, at step 704, redundant packets may be eliminated at a wired/wireless multi-hop interface to improve transmission efficiency. Furthermore, at step 706, packets may be locally retransmitted at the wired/wireless multi-hop interface to avoid timeout and thereby improve traffic quality. Packet queue reordering, redundant packet elimination and local retransmission is described in more detail below with regard to FIGS. 8, 9 and 10, respectively. It should be noted that each of steps 702, 704 and 706 may be performed alone or in addition to and/or simultaneously with any other step of method 700. Moreover, it should be understood that performance of all steps improves transmission efficiency and maintenance of voice quality.

Figure 8:
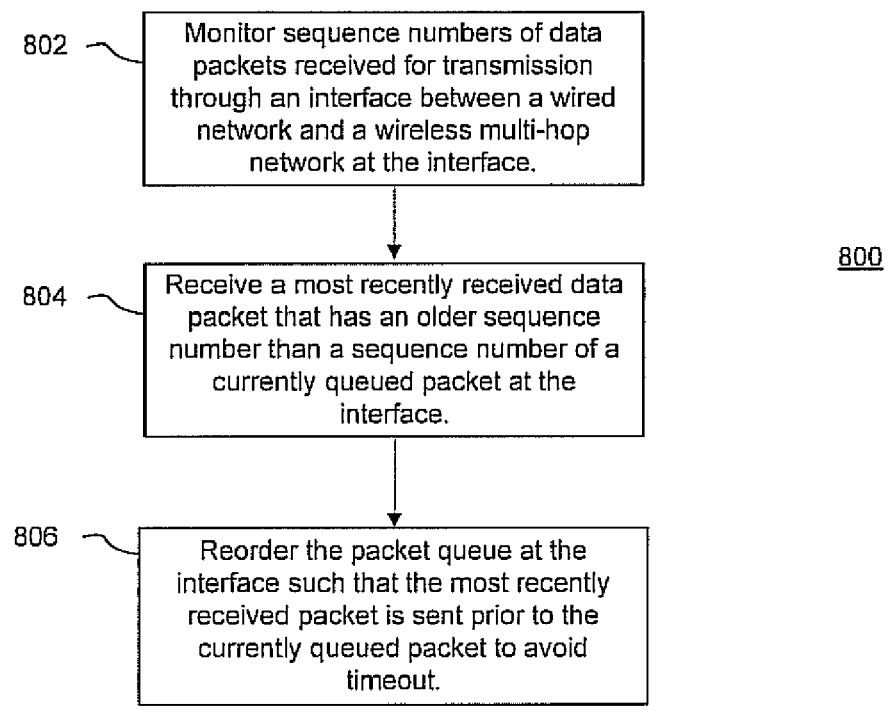
FIG. 8 is a high level block/flow diagram of an exemplary method for reducing traffic congestion and improving traffic quality by reordering a packet queue at a wired/wireless multi-hop interface in accordance with one or more implementations of the present principles.

Referring to FIG. 8 with continuing reference to FIGS. 5 and 7, a method 800 for reordering a packet queue that may be performed at step 702 is illustrated. Typically, in TCP applications, if a sender does not receive an acknowledgement from a receiver that a packet has been received, then the sender retransmits the packet. Retransmission of packets consumes network bandwidth and has the potential to degrade overall network performance. Additionally, with regard to wireless multi-hop networks, increased data packet congestion on wireless multi-hop points increases the likelihood of interference, which may induce packet loss and reduce the quality of both data packets and voice packets. In accordance with one aspect of the present principles, a packet queue may be reordered in accordance with method 800 to prevent unnecessary retransmission of data packets from a sender.

For example, method 800 may begin by monitoring sequence numbers of data packets received for transmission through the interface between the wired network and the wireless multi-hop network at the interface. The interface may, for example, correspond to gateway 500 and the redundancy eliminator 514 and/or the queue manager 508 may be configured to monitor the sequence numbers of incoming data packets.

At step 804, a most recently received data packet that has an older sequence number than a sequence number of a currently queued packet may be received at the interface. For example, the most recently received data packet may correspond to the last data packet received at the interface.

At step 806, a packet queue may be reordered at the interface such that the most recently received packet is sent prior to the currently queued packet to avoid timeout for the most recently received packet and thereby reduce congestion on the wireless multi-hop network and improve traffic quality. For example, the redundancy eliminator 514 and/or the queue manager 508 may be configured to reorder the packet queue.

With TCP applications, it may be assumed that a received data packet, received at the interface from a sender, is a retransmitted packet if the received data packet has a sequence number that is older than a data packet currently queued at the interface for transmission to the same destination as the received data packet. The received data packet has likely been sent due to a duplicate acknowledgement packet received at the sender from the intended destination. In accordance with method 800, a gateway or an interface between a wired network and a wireless multi-hop network may be configured to recognize that a received data packet is a retransmitted packet that is susceptible to a timeout. Thus, to avoid timeout, reduce unnecessary congestion on the wireless multi-hop network and improve traffic quality, the received packet may be transmitted to the destination immediately from the gateway as a result of reordering the packet queue.

Figure 9:
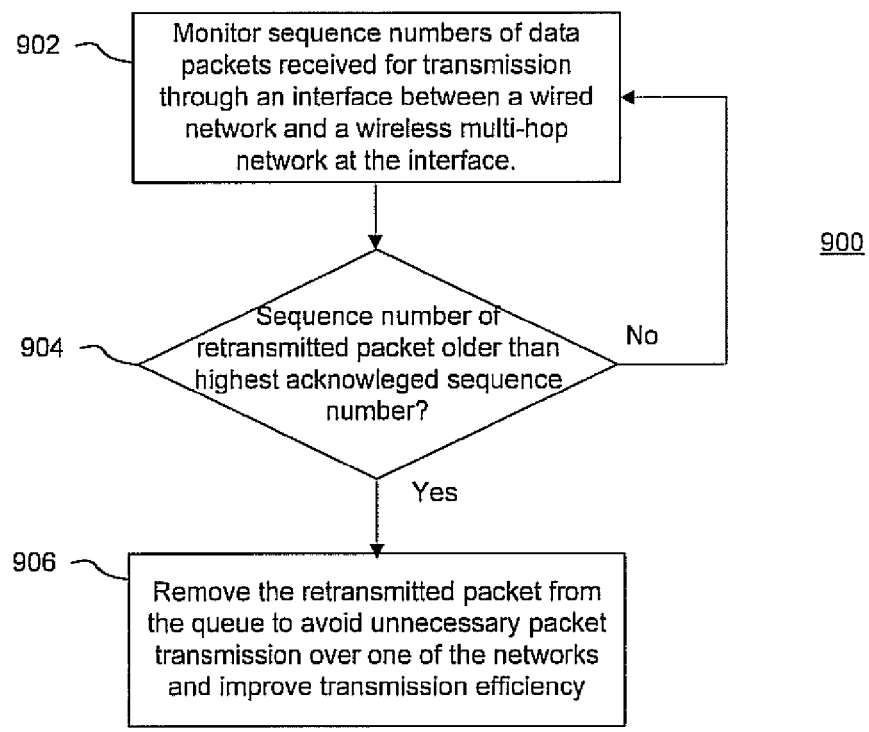
FIG. 9 is a high level block/flow diagram of an exemplary method for improving transmission efficiency by eliminating redundant packets at a wired/wireless multi-hop network interface in accordance with one or more implementations of the present principles.

Referring to FIG. 9, with continuing reference to FIGS. 5, 7 and 8, a method 900 for eliminating redundant packets at a wired/wireless multi-hop interface to improve transmission efficiency that may be performed in step 704 is illustrated.

Method 900 may begin at step 902 in which sequence numbers of data packets received at an interface between a wired network and a wireless multi-hop network for transmission through the interface may be monitored at the interface. For example, step 902 may be step 802 if method 800 is performed. In addition, the interface may, for example, correspond to gateway 500. The redundancy eliminator 514 and/or the queue manager 508 may be configured to monitor the sequence numbers in headers of incoming data packets. Further, the data packets may be parsed from voice packets by classifier 502 and sent to redundancy eliminator 514. Additionally, the data acknowledgement packets may be parsed from voice packets by classifier 526 and sent to redundancy eliminator 514.

At step 904, it may be determined whether a sequence number of a retransmitted packet is older than a highest acknowledged sequence number. For example, the redundancy eliminator 514 may be configured keep track of the Acknowledgements (ACK) received from intended destinations by reading ACK packet headers. The redundancy eliminator 514 may also store the highest or newest acknowledged sequence number for one or more data streams transmitted through the interface. Thus, when a packet is received at the interface, the redundancy eliminator 514 may be configured to compare the sequence number of the newly or most recently received packet to the highest acknowledged sequence number to determine whether the sequence number of the received packet is older than the highest acknowledged sequence number. If the sequence number of a received packet is not older than the highest acknowledged sequence number, then step 902 may be repeated until a new data packet is received, after which step 904 may be performed again. If the sequence number of a received packet is older than the highest acknowledged sequence number, then the method 900 may proceed to step 906, as the newly received packet is a retransmitted packet that has already arrived at its intended destination.

At step 906, the retransmitted packet may be removed from the packet queue to avoid unnecessary packet transmission over one of the networks and thereby improve transmission efficiency. For example, the redundancy eliminator 514 may be configured to remove the retransmitted packet from the data packet queue 506 to avoid retransmission of the packet over the wireless multi-hop network, as it has already been received at its intended destination. It should be understood that removal of a packet from a packet queue is equivalent to preventing the packet from being placed within the queue and/or preventing the packet from being transmitted to its intended destination.

Figure 10:
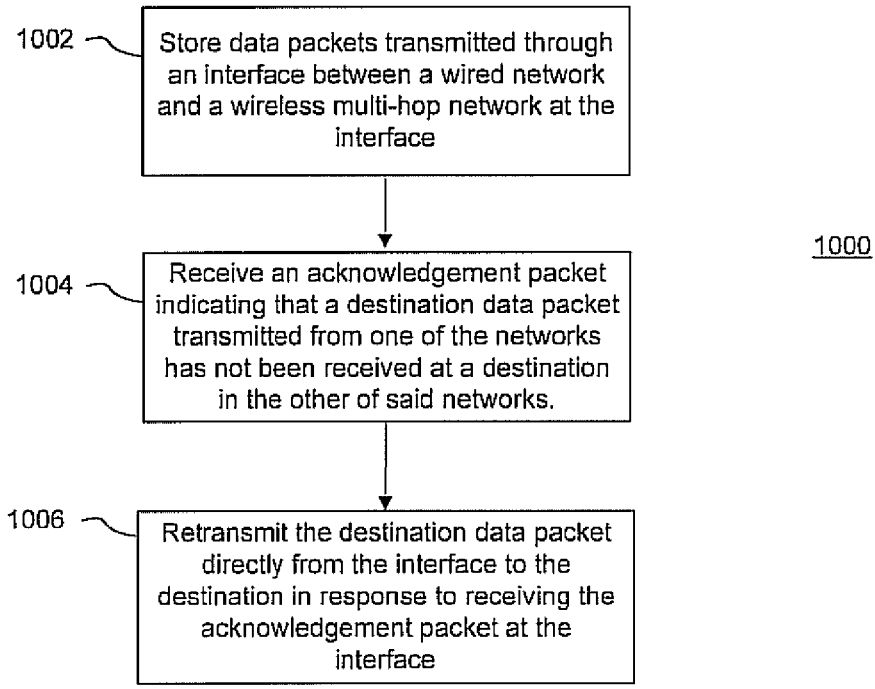
FIG. 10 is a high level block/flow diagram of an exemplary method for improving traffic quality by locally retransmitting data packets from a wired/wireless multi-hop network interface in accordance with one or more implementations of the present principles.

Referring now to FIG. 10, with continuing reference to FIGS. 5 and 7, a method 1000 for locally retransmitting a packet at a wired/wireless multi-hop interface to avoid timeout and thereby improve traffic quality that may be performed in step 706 is illustrated. Method 1000 may begin at step 1002 in which data packets transmitted through an interface between a wired network and a wireless multi-hop network may be stored at the interface. For example, the local recovery module 528 may be configured to store incoming data packets placed in packet queue 506. In addition, the local recovery module 528 may be further configured to have a particular number of memory blocks dedicated for the storage of data packets in which least recently stored packets are replaced by newly received data packets as the newly received data packets are received at the interface.

At step 1004, an acknowledgement (ACK) packet may be received at the interface. The ACK may indicate that a destination data packet transmitted from one of said networks has not been received at a destination in the other of said networks. For example, an ACK packet may be received at and parsed from voice data traffic by classifier 526. The ACK packets may be transmitted to the local recovery module 528, which may be configured to read the sequence numbers of the ACK packet headers and store them in a specific number of memory blocks allocated to ACK sequence numbers. In addition, the least recently stored ACK sequence numbers may be replaced by sequence number of newly received data packets as the newly received data packets are received at the interface.

At step 1006, a destination data packet that has not been received at a destination may be retransmitted directly from the interface to the destination in response to receiving the acknowledgement packet at the interface. For example, the local recovery module may be configured to compare a most recently received ACK sequence number to an ACK sequence number stored in its memory. Further, the ACK sequence number of the most recently received ACK packet may be compared to the ACK sequence number received just prior to the most recently received ACK sequence number. If the comparison reveals that the most recently received ACK sequence number is a duplicate ACK sequence number, then a data packet stored at step 1002 with a next sequence number after the duplicate ACK sequence number, e.g., duplicate ACK sequence number+1, is retransmitted directly from the interface. A duplicate acknowledgement may indicate that a data packet with a next sequence number has been dropped during transmission. In accordance with an aspect of the present principles, the duplicate ACK need not be transmitted to the original sender from the interface, which in turn reduces network congestion. Moreover, the local retransmission of the data packet from the gateway reduces the likelihood of timeout, further improving data and voice traffic transmission quality due to the lower likelihood of interference as a result of reduced congestion over the wireless multi-hop network. In addition, avoiding timeout prevents the sender from stopping its transmission unnecessarily, thereby further improving data traffic throughput, especially with regard to large BDP networks. Furthermore, method 900 complies with end to end semantics of TCP protocol.

Table 2 provides an exemplary algorithm incorporating both method 900 and method 1000. However, it should be understood that each of methods 800, 900 and 1000 may be performed independently or in any combination, as stated above.

TABLE 2

Algorithm 2

TCP packet sequence number: seq
TCP highest acknowledged sequence number: highest_seq
PQueue: Pacing or Packet Queue of TCP Rate Shaper
loop
  for all received packets do
    if packet type == VOIP then
      send to QE;
    else if packet type ==TCP Data then
      read seq from TCP header
      if seq <=highest_seq then
        Drop it (Redundent packets elimination);
      else
        send it to PQueue
      end if
    else if packet type == TCP ACK then
      read seq from TCP ACK header;
      if duplicated ACK then
        retransmit TCP data with seq +1 ( Local recovery);
      else TABLE 2-continued Algorithm 2 update highest_seq
      end if
    end if
  end for
end loop

As stated above, any one or more of methods 800, 900 and 1000 may be performed to address problems that may arise from a limitation of bandwidth allocated to data traffic in accordance with method 600. One such problem, as stated above, may be some degree of performance degradation for data traffic due to a data packet queue overflow. A related problem that may arise in certain situations is that transmission of data packets from an interface or gateway between a wired and a wireless multi-hop network may be delayed in accordance with a data transmission rate allocated to induce or maintain voice traffic quality. Delayed transmission of data packets may, in turn, cause queuing delay, which may result in a long round trip delay time or RTT at a data traffic sender.

Queuing delay for TCP traffic and other types of data traffic may increase linearly until the number of packets transmitted before receiving an acknowledgement at a sender reaches the minimum of either an acknowledgement window (awnd) or a congestion window (cwnd), e.g. min(awnd, cwnd). As understood by those of ordinary skill in the art, in accordance with TCP, the congestion window is set by the sender and is calculated based on an assessment of a degree of congestion between the sender and the destination. The congestion window corresponds to an estimation of the maximum amount of traffic that a sender should send to a destination before receiving an ACK packet. Additionally, the advertisement window is set by the receiver at the intended destination and is typically based on the capacity of data traffic the receiver can process. A sender is informed of awnd through ACK packets received from the intended destination. Thus, in accordance with a TCP scheme, the maximum amount of traffic a sender may transmit during the time between receiving ACK packets corresponds to the minimum value of awnd and cwnd, min (awnd, cwnd). As stated above, the sender may reach min (awnd, cwnd) due to a queuing delay resulting from compliance with an allocated data transmission rate.

Furthermore, if a local recovery or retransmission method, such as method 1000, is performed, the sender may underestimate the number packet drops in the network because of the reduced amount of duplicate acknowledgements received and the lack of timeouts. Accordingly, the sender's determination of congestion and path quality may be inaccurate, causing the sender to increase data traffic on a wireless multi-hop network, thereby increasing the likelihood of interference and reducing voice and data traffic quality.

To address these issues, in accordance with one or more aspects of the present principles, an adaptive queue-aware window control method may be applied to minimize the queuing delay and buffer requirement at the gateway between a wired network and a wireless multi-hop network. With regard to TCP acknowledgement or advertisement window size, the wireless multi-hop extension of a wired network may be considered as being a bottleneck in the hybrid wired/wireless network. The queuing and network delay in the multi-hop portion of the network tends to be much larger than the delay in the wired portion. Accordingly, the following condition may be derived:

$$q_i(t)+M_i(t)<\min(\text{awnd}(t),\text{cwnd}(t)) \quad (2)$$

wherein the queue length of a packet queue or a pacing queue at the gateway is denoted as $q_i(t)$ at an arbitrary time t and the number of packets in delivery or in transit over the multi-hop portion of the hybrid network is denoted as $M_i$ at the arbitrary time t. $M_i$ may correspond to (max_sent_seq−highest_ack), where max_sent_seq is the highest sequence number of a data packet transmitted from the gateway to the wireless multi-hop network and highest_ack is the highest sequence number of an ACK packet received at the gateway. Subscript i is used herein as an index for the connections. Here, equation 2 represents the maximum number of packets in transit, which are clearly less than the TCP sender's congestion window size. According to one or more implementations of the present principles, the queue length may be controlled by modifying the advertisement window (awnd) of the ACK packets. Further, in one or more queue-aware window control management method implementations, the downstream queue length $q_i(t)$ may represent the queuing delay.

Figure 11:
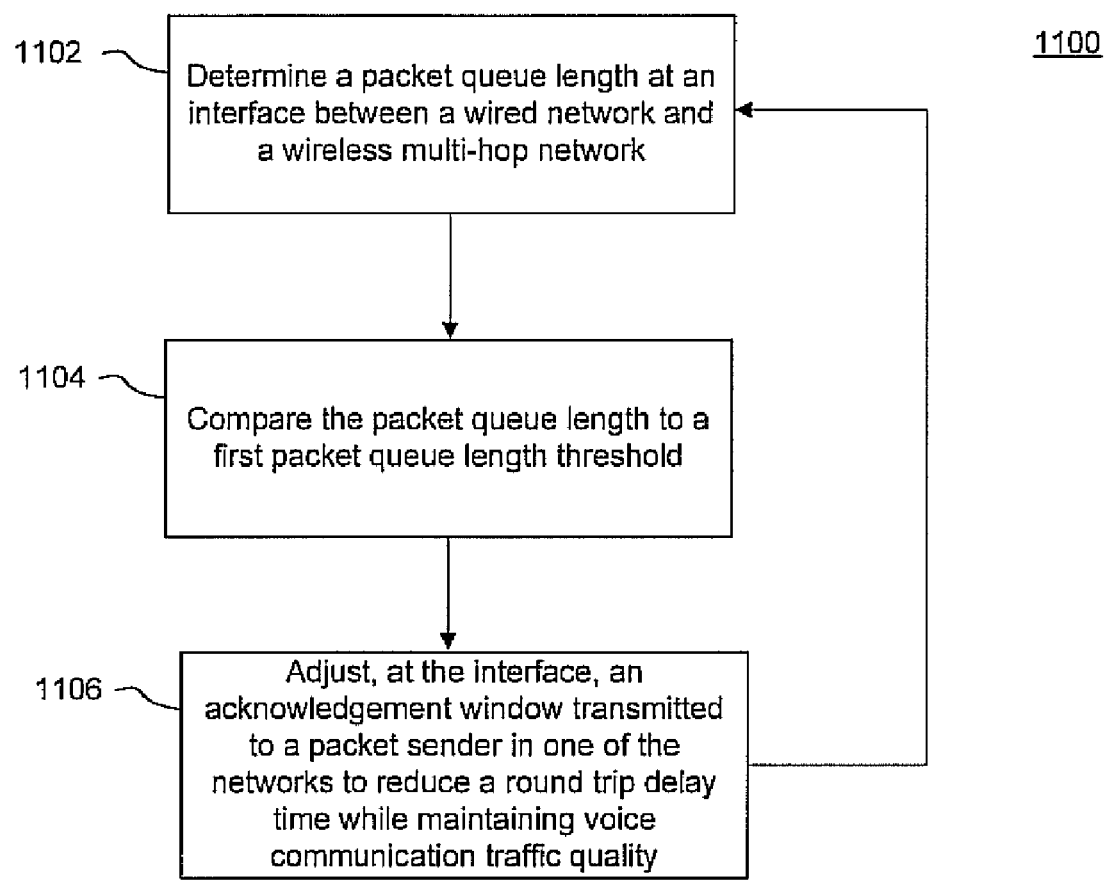
FIG. 11 is a high level block/flow diagram of an exemplary method for managing a packet queue at an interface between a wired network and a wireless multi-hop network to improve the quality of data communication traffic while maintaining voice communication traffic quality over the networks in accordance with one or more implementations of the present principles.

Referring now to FIG. 11 with continuing reference to FIG. 5, a method 1100 for managing a packet queue at an interface between a wired network and a wireless multi-hop network to improve the quality of data communication traffic while maintaining voice communication traffic quality over the networks in accordance with an exemplary implementation of the present principles is illustrated. Method 1100 may be employed, for example, to address any queuing delay that may arise from delaying the transmission of data packets in accordance with a rate allocation scheme and/or to address any inaccuracies of a sender's estimation of network quality that may occur as a result of local packet retransmission from the interface. Method 1100 may be performed independently of methods 600 and 700 or it may be performed in addition to or simultaneously with any one or more of methods 600, 700 and/or their corresponding steps.

Method 1100 may begin at step 1102, in which a packet queue length at an interface between a wired network and a wireless multi-hop network may be determined. For example, the queue manager 508 may be configured to monitor the queue length of data packet queue 506. Further, the monitoring may be performed periodically. For example, step 1102 may be performed every time an ACK packet is received.

At step 1104 the determined packet queue length may be compared to a packet queue length threshold. For example, the determined packet queue length may be compared to a maximum packet queue length threshold q_max. Additionally or alternatively, the determined packet queue length may be compared to a minimum packet queue length threshold q_min. Here, q_min may be less than q_max. In an implementation of the present principles, the queue manager 508 may be configured to perform step 1104.

At step 1106, at the interface between the wired network and the wireless multi-hop network, an acknowledgement window transmitted to a packet sender in one of the networks may be adjusted to reduce a round trip delay time while maintaining voice communication traffic quality. For example, the acknowledgement window may correspond to an advertisement window, awnd, of an acknowledgment packet received at the interface from a wireless multi-hop network for transmission to a wired network. If the comparison of the determined queue length to the maximum packet queue length threshold q_max reveals that the queue length has exceeded q_max, then the awnd may be reduced to the sum of the minimum packet queue length threshold q_min and the number of packets $M_i$ in transit over the wireless multi-hop network in response to determining that the packet queue length exceeds the maximum packet queue length threshold. Additionally or alternatively, if the comparison of the determined queue length to the minimum packet queue length threshold q_min reveals that the queue length has fallen below q_min, then the awnd may be increased to the sum of the maximum packet queue length threshold q_max and the number of packets $M_i$ in transit over the wireless multi-hop network in response to determining that the packet queue length falls below the minimum packet queue length threshold. Additionally or alternatively, if the comparisons reveal that the determined queue length is at or between q_min and q_max, then the awnd may be set to the sum of the number of packets $M_i$ in transit over the wireless multi-hop network and the mean of the maximum packet queue length threshold q_max and the minimum packet queue length threshold q_min in response to determining that the packet queue length is at or between q_min and q_max. Further, in one or more implementations of the present principles, if method 600 is performed such that the bandwidth allocated to data traffic transmission is set to zero and the determined packet queue length threshold exceeds q_max, the awnd may be set to zero to freeze all timers at the data sender. Thereafter, step 1102 may be performed and method 1100 may be repeated. It should also be noted that queue manager 508 may be configured to communicate with the local recovery module 528. Thus, in response to commands received from queue manager 508, the local recovery module 528 may be configured to perform step 1106. Values of q_min=2 and q_max=6 have been shown to be reasonable choices for obtaining a sufficiently low queuing delay while preventing buffer underflow. For example, by applying method 1100 using q_min and q_max values of 2 and 6, respectively, an RTT of 3 seconds may be reduced to 310 milliseconds for a four-hop wireless network without affecting data goodput and voice quality.

Table 3 provides an exemplary algorithmic implementation of method 1100. In algorithm 3, q_min may correspond to $q_{min\_i}$ and q_max may correspond to $q_{max\_i}$.

TABLE 3

Algorithm 3 if $q_i(t) < q_{min\_i}$ then
    awnd ← $q_{max\_i} + M_i(t)$
else if $q_i(t) > q_{max\_i}$ and $R_i(t) > 0$ then
    awnd ← $q_{min\_i} + M_i(t)$
else if $q_i(t) > q_{max\_i}$ and $R_i(t) == 0$ then
    awnd ← 0
else $$\text{awnd} \leftarrow \frac{q_{max\_1} + q_{min\_1}}{2} + M_i(t)$$

end if

Figure 12:
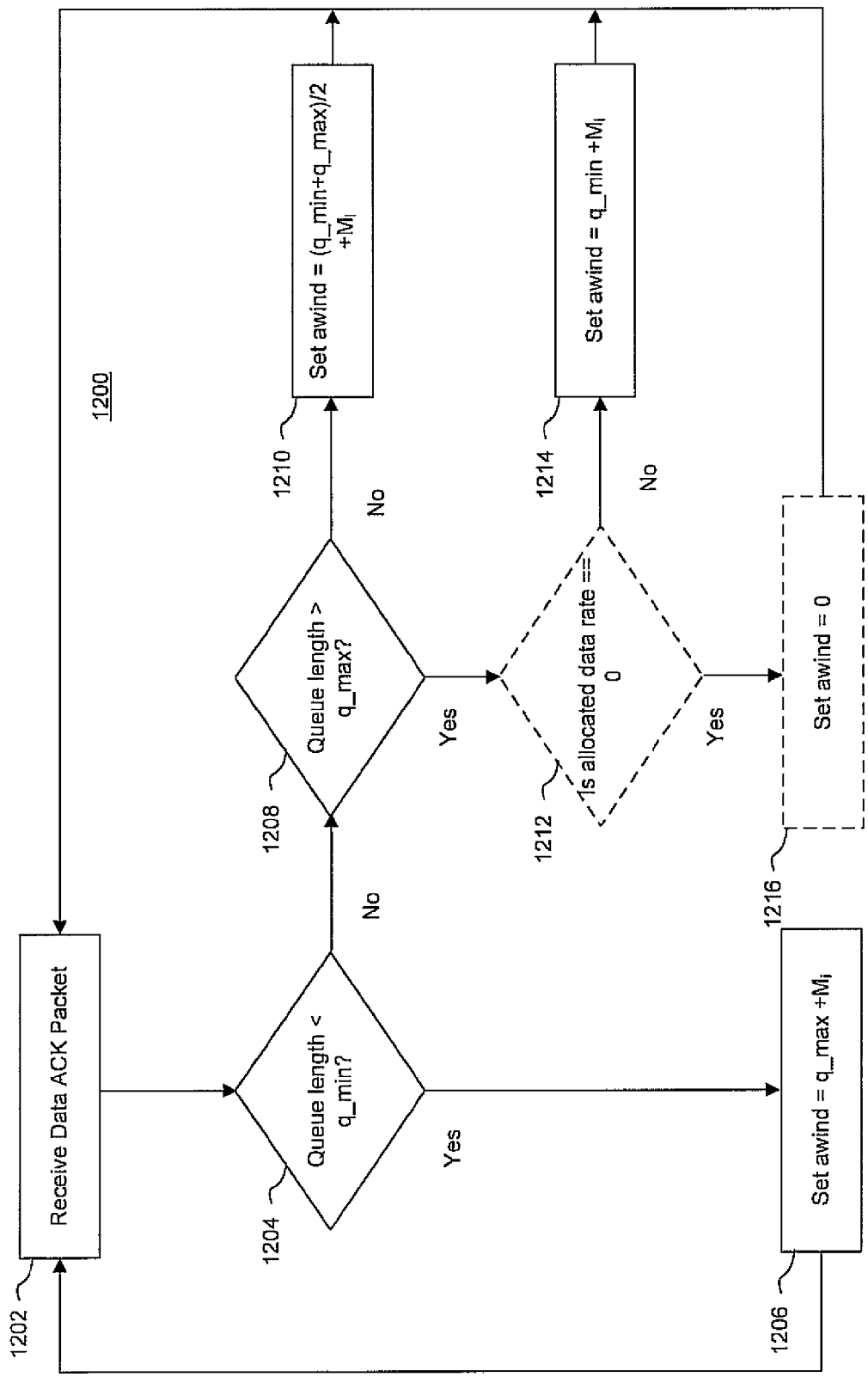
FIG. 12 is a high level block/flow diagram of a more specific exemplary method for managing a packet queue at an interface between a wired network and a wireless multi-hop network to improve the quality of data communication traffic while maintaining voice communication traffic quality over the networks in accordance with one or more implementations of the present principles.

Referring to FIG. 12 with continuing reference to FIGS. 5, 6 and 11, a more specific method implementation 1200 of method 1100 is depicted. Method 1200 may be performed at gateway 500, for example. Further, method 1200 may begin at step 1202 in which a data ACK packet is received.

At step 1204, it may be determined whether a packet queue length less than q_min. The packet queue may correspond to a queue 506 of data packets received at gateway 500 from a wired network for transmission to a wireless multi-hop network.

At step 1206, if the packet queue length is less than q_min, then awnd may be set to q_max+$M_i$. Otherwise, the method may proceed to step 1208.

At step 1208, it may be determined whether a packet queue length is greater than q_max.

At step 1210, if the packet queue length is not greater than q_max, then awnd may be set to (q_min+q_max)/2+$M_i$.

Optionally, after step 1210, if the packet queue length is greater than q_max and a data rate has been allocated for the transmission of data packets across a wireless multi-hop network, then step 1212 may be performed. The data rate may be allocated in accordance with method 600, for example.

Optionally, at step 1212, whether the allocated data rate is zero may be determined.

Optionally, at step 1216, if the allocated data rate is zero, then awnd may be set to zero. Otherwise, step 1214 may be performed.

At step 1214, awnd may be set to q_min+$M_i$.

After the performance of any one of steps 1206, 1210, 1214 or 1216, method 1200 may be repeated.

With reference again to FIGS. 2, 5, 6, 7 and 11, it can be shown that applying any one or more of methods 600, 700 and 1100 to a gateway 500 improves voice quality and bandwidth utilization for data traffic. For example, as illustrated in plot 300 of FIG. 2, in contrast to prior art methods, an implementation of the present principles has consistently achieved a GSM standard voice traffic quality threshold or better over a variety of multi-hop string topology configurations on which data traffic is also transmitted. Similar results have been achieved for tree topologies. Furthermore, it can be shown that implementations of the present principles improves fairness between traffic streams, permits dynamic bandwidth estimation for quick responsiveness to changing conditions, and may be applied to a large variety of different interference scenarios.

Having described implementations of systems and methods (which are intended to be illustrative and not limiting), it is noted that modifications and variations can be made by persons skilled in the art in light of the above teachings. It is therefore to be understood that changes may be made in the particular implementations disclosed which are within the scope and spirit of the invention as outlined by the appended claims. Having thus described aspects of the present principles, with the details and particularity required by the patent laws, what is claimed and desired protected by Letters Patent is set forth in the appended claims.

What is claimed is:

1. A method for managing packet transmission through an interface between a wired network and a wireless multi-hop network at the interface to improve the quality of data and voice communication traffic over the networks comprising:

monitoring sequence numbers of data packets received for transmission through an interface between a wired network and a wireless multi-hop network at the interface;

receiving a most recently received data packet that has an older sequence number than a sequence number of a currently queued packet at the interface;

reordering a packet queue at the interface such that the most recently received packet is sent prior to the currently queued packet to avoid timeout for the most recently received packet and thereby reduce congestion on the wireless multi-hop network and improve traffic quality;

receiving at the interface an acknowledgement packet indicating that a destination data packet transmitted from one of said networks has not been received at a destination in the other of said networks; and retransmitting the destination data packet directly from the interface to the destination in the other of said networks in response to receiving the acknowledgement packet at the interface to avoid retransmission of the destination data packet from an original destination data packet sender, the acknowledgement packet being a duplicated acknowledgement packet and the destination packet being selected for retransmission by determining that the destination packet has a next sequence number after the sequence number of the duplicated acknowledgement.

2. The method of claim 1, further comprising:

determining that a sequence number of a retransmitted packet received at the interface between the wired network and the wireless multi-hop network for transmission through the interface is temporally older than a highest sequence number acknowledged by an acknowledgement packet received at the interface; and removing the retransmitted packet from the queue to avoid unnecessary packet transmission over one of the networks and thereby improve transmission efficiency.

3. The method of claim 1, further comprising:

monitoring network parameters for voice packets at the interface between the wired network and the wireless multi-hop network;

determining a rate adjustment value for data traffic transmission over the wireless multi-hop network based on a voice packet quality measure calculated from the network parameters; and dynamically adjusting a data packet transmission rate over the wireless multi-hop network at the interface in accordance with the rate adjustment value to induce or maintain a voice quality level for voice packet traffic while maximizing bandwidth dedicated to data packet traffic.

4. The method of claim 3, further comprising:

determining a packet queue length at the interface between the wired network and the wireless multi-hop network;

comparing the packet queue length to a first packet queue length threshold; and adjusting, at the interface, an acknowledgment window of information transmitted to a packet sender in one of said networks based on the comparing and based on the number of packets in transit in the other of said networks to reduce a round-trip delay time while maintaining voice communication traffic quality.

5. A method for managing a packet queue at an interface between a wired network and a wireless multi-hop network to improve the quality of data communication traffic while maintaining voice communication traffic quality over the networks comprising:

determining a packet queue length at an interface between a wired network and a wireless multi-hop network;

comparing the packet queue length to a first packet queue length threshold;

adjusting, at the interface, an acknowledgment window of information transmitted to a packet sender in one of said networks based on the comparing and based on the number of packets in transit in the other of said networks to reduce a round-trip delay time while maintaining voice communication traffic quality;

wherein if the first packet queue length threshold is a maximum packet queue length threshold then the adjusting further comprises one of 1) reducing the acknowledgment window of information to a sum of a minimum packet queue length threshold and the number of packets in transit in response to determining that the packet queue length exceeds the maximum packet queue length threshold and 2) setting the acknowledgment window of information to a sum of the number of packets in transit and a mean of a minimum packet queue length threshold and the maximum packet queue length threshold in response to determining that the packet queue length is between the maximum packet queue length threshold and the minimum packet queue length threshold; and wherein if the first packet queue length threshold is a minimum packet queue length threshold then the adjusting further comprises increasing the acknowledgment window of information to a sum of a maximum packet queue length threshold and the number of packets in transit in response to determining that the packet queue length is less than the minimum packet queue length threshold.

6. The method of claim 5, further comprising:

monitoring network parameters for voice packets at the interface between the wired network and the wireless multi-hop network;

determining a rate adjustment value for data traffic transmission over the wireless multi-hop network based on a voice packet quality measure calculated from the network parameters; and dynamically adjusting a data packet transmission rate over the wireless multi-hop network at the interface in accordance with the rate adjustment value to induce or maintain a voice quality level for voice packet traffic while maximizing bandwidth dedicated to data packet traffic.

7. The method of claim 6, wherein the first packet queue length threshold is a maximum packet queue length threshold and the adjusting an acknowledgment window further comprises reducing the acknowledgment window to zero in response to determining that the packet queue length exceeds the maximum packet queue length threshold and that the dynamically adjusted data packet transmission rate is zero.

8. The method of claim 6, further comprising:

monitoring sequence numbers of data packets received for transmission through the interface between the wired network and the wireless multi-hop network at the interface;

receiving a most recently received data packet that has an older sequence number than a sequence number of a currently queued packet at the interface; and reordering a packet queue at the interface such that the most recently received packet is sent prior to the currently queued packet to avoid timeout for the most recently received packet and thereby reduce congestion on the wireless multi-hop network and improve traffic quality.

* * * * *